(No Model.)
R. L. WEBB.
SELF CLOSING FAUCET.
No. 275,300. Patented Apr. 3, 1883.
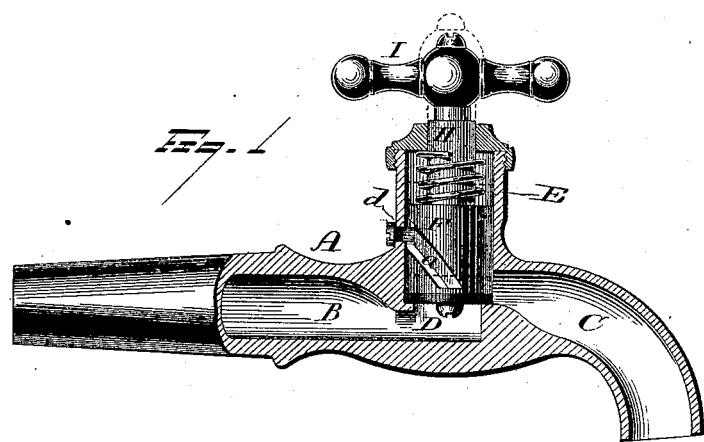
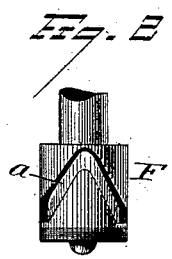

United States Patent Office.

RODOLPHUS L. WEBB, OF NEW BRITAIN CONNECTICUT, ASSIGNOR TO LANDERS, FRARY & CLARK, OF SAME PLACE.

SELF-CLOSING FAUCET.

SPECIFICATION forming part of Letters Patent No. 275,300, dated April 3, 1883.

Application filed December 26, 1882. (No model.)

*To all whom it may concern:*

Be it known that I, RODOLPHUS L. WEBB, of New Britain, in the county of Hartford and State of Connecticut, have invented a new Improvement in Self-Closing Faucets; and I do hereby declare the following, when taken in connection with accompanying drawings and the letters of reference marked thereon, to be a full, clear, and exact description of the same, and which said drawings constitute part of this specification, and represent, in—

Figure 1, a sectional side view; Fig. 2, side view of the valve detached.

This invention relates to an improvement in that class of faucets for drawing water and other fluids which are constructed so as to be self-closing—that is to say, so that when opened, unless held open, a device in connection therewith will automatically close the faucet; and the invention consists in a valve arranged to close the water-way against the pressure of water, the shank or body of the valve constructed with an inverted-V-shaped groove, a stud in the wall of the valve-chamber to enter said groove and stand at the apex of the groove when the valve is closed, combined with a spindle and handle, whereby a rotative movement may be imparted to the valve, the said groove operating upon said stud to cause the valve to rise, whether it be turned to the right or left, and a spring arranged in the valve-chamber and bearing upon the valve, and acting to force the valve to its seat when free from the power which opened it, as more fully hereinafter described.

A represents the body of the faucet, which is of the usual form; B, the inlet-passage; C, the outlet; and D, the valve-seat; E, the valve-chamber, which is vertical, or at right angles to the water-way in the usual manner for this class of faucets.

F is the body of the valve, its lower end constructed to bear upon the valve-seat, and so as to close the opening from the passage B to the passage C. This body F is cylindrical, and should substantially fit the chamber in which it stands, but so as to move freely up and down therein. On one side of this body an inverted-V-shaped groove, *a*, is formed, as seen in Fig. 2, and in the side of the valve-chamber, at a point corresponding to the apex of this groove, a stud, *d*, is arranged to stand in this groove. This stud is best formed by a screw introduced from the outside, its end to enter the groove, as seen in Fig. 1. From the valve a spindle, H, extends up through a stuffing-box above, and at the outside is fitted with any suitable handle, I, by which the spindle and the valve may be turned. Around the spindle, and between the valve and the top of the valve-chamber, is a helical or other suitable spring, L, taking a pressure upon the top of the valve sufficient to resist the pressure of the water as it stands in the passage B. If in this condition the valve be turned to either the right or left, that side of the groove, according to which way the valve is turned, will travel upon the stud *d* and cause the valve to rise, as indicated in broken lines, Fig. 1, and so long as the power which thus turns the valve remains, the valve will stand open; but so soon as that power is relaxed or removed then the spring L reacts and forces the valve downward. The incline of the groove, passing over the stud *d*, causes the valve to return to its closed position, bringing the apex of the groove again to the stud, and causing the stud thus to stand in the apex of the V, ready to receive either side of the groove. The rotation of the valve in either direction will cause the valve to rise.

By this invention I aim to simplify the construction of the faucet and reduce its cost of manufacture. This construction also permits the turning of the faucet to either the right or left—an advantage over this class of faucets in which the handle can only be turned in one direction.

I claim—

The combination of a faucet having an inlet-passage, B, an outlet-passage, C, and a valve-seat, D, between them, with a valve, the body of which is constructed with an inverted-V-shaped groove, a stud in the valve-chamber standing in, and at the apex of said groove a spindle extending from the valve outside the valve-chamber, and there provided with a handle, by which the valve may be turned, and a spring, the action of which is to force the valve to its seat against the pressure of the water, substantially as described.

RODOLPHUS L. WEBB.

Witnesses:
C. S. LANDERS,
A. B. WETHERELL.